US012790079B2

(12) United States Patent
Schofield et al.

(10) Patent No.: US 12,790,079 B2
(45) Date of Patent: Nov. 10, 2026

(54) SNAP-ON CAP FOR CONTAINER

(71) Applicants: Robin Schofield, Lancaster, MA (US); Richard Goulston, Stuart, FL (US)

(72) Inventors: Robin Schofield, Lancaster, MA (US); Richard Goulston, Stuart, FL (US)

(73) Assignee: SOLMETEX LLC, Northborough, MA (US)

( * ) Notice: Subject to any disclaimer, the term of this patent is extended or adjusted under 35 U.S.C. 154(b) by 0 days.

(21) Appl. No.: 18/884,588

(22) Filed: Sep. 13, 2024

(65) Prior Publication Data

US 2025/0178793 A1 Jun. 5, 2025

Related U.S. Application Data

(63) Continuation of application No. 17/770,517, filed as application No. PCT/US2020/058605 on Nov. 2, 2020, now Pat. No. 12,091,218.

(51) Int. Cl.
*B65D 41/18* (2006.01)
*A61C 19/00* (2006.01)

(52) U.S. Cl.
CPC .............. *B65D 41/18* (2013.01); *A61C 19/00* (2013.01)

(58) Field of Classification Search
CPC ......... A61C 5/66; A61C 17/06; A61C 17/065; A61C 17/14; A61C 19/00; A61C 2202/00; B65D 41/18; B65D 43/02; B65D 43/0202; B65D 43/0212; B65D 45/16; B65D 45/18
USPC .......................................... 206/63.5; 220/796
See application file for complete search history.

(56) References Cited

U.S. PATENT DOCUMENTS 6,439,380 B1 * 8/2002 Welsh ...................... A61C 5/66 206/219
8,777,032 B2 * 7/2014 Biesecker .......... B65D 43/0212 220/780
9,187,220 B2 * 11/2015 Biesecker .......... B65D 43/0212
10,342,647 B2 * 7/2019 Stolarik ............... A61C 17/065
10,646,313 B2 * 5/2020 Mozzicato ........... A61C 17/065
10,779,923 B2 * 9/2020 Mozzicato ........... A61C 17/065

FOREIGN PATENT DOCUMENTS

WO WO-2018006106 A1 * 1/2018 ............. A61C 17/14

* cited by examiner

*Primary Examiner* — Bryon P Gehman

(57) ABSTRACT

The present invention provides a snap-on cap that is useful with containers, and in particular, collection containers useful for dental amalgam recycling systems. The snap-on cap is useful for shipping and recycling of particles from a dental liquid effluent drawn, for example, from a suctioning device.

14 Claims, 7 Drawing Sheets

SNAP-ON CAP FOR CONTAINER

FIELD OF THE INVENTION

This invention relates to an improved, snap-on cap that is suitable for use with containers, such as collection containers used in dental amalgam separation, collection and recycling systems. Such systems are used to remove particles from effluent waste, and particularly, to remove amalgam and other metallic particles and other abrasive solids from dental office suction effluent. The present invention is useful for conveniently forming an air-tight and liquid-tight seal on a detachable collection container, which facilitates storage and shipping for customer regulatory compliance and environmental safeguards. Applicants have designated the snap-on cap of the present invention as the "SnapCap™."

BACKGROUND OF THE INVENTION

Dental amalgam is a dental filling material used to fill cavities caused by tooth decay. It has been used for more than 150 years in hundreds of millions of patients around the world. Dental amalgam is a mixture of metals, consisting of liquid (elemental) mercury and a powdered alloy composed of silver, tin, and copper. Approximately 50% of dental amalgam is elemental mercury by weight. The chemical properties of elemental mercury allow it to react with and bind together the silver/copper/tin alloy particles to form an amalgam. See http://www.fda.gov/MedicalDevices/ProductsandMedical Procedures/DentalProducts/DentalAmalgam/ucm171094.htm, accessed Sep. 9, 2016.

Amalgam is used less often than in the past, mostly because tooth-colored materials now can be used. However, the newer materials can't be used for all dental situations, amalgam is less costly than newer materials, and it lasts longer, especially in teeth that undergo a lot of pressure and wear from chewing.

Better dental health overall coupled with increased demand for more modern alternatives such as resin composite fillings (which match the tooth color), as well as public concern about the mercury content of dental amalgam, have resulted in a steady decline in dental amalgam use in developed countries, though overall amalgam use continues to rise worldwide. Stein et al. (2005). "Composite resin in medicine and dentistry". Journal of long-term effects of medical implants. 15 (6): 641-54. doi:10.1615/jlongtermeffnedimplants. v15.i6.70. PMID 16393132.

Although amalgams are less frequently used in developed countries for new dental fillings than in the past, amalgams continue to make up a portion of the particle component of dental office effluent mainly because of the fact that old fillings made of amalgams are drilled out and removed in the effluent waste when new fillings are effected to replace the old. Further, as noted above, even under current dental practice, an amalgam is preferred for some tooth filling situations.

Because mercury is a poisonous substance that can accumulate in living tissues and can pose a health hazard to species in a food chain exposed to mercury-containing compounds, and since humans are inevitably at the end of the food chain, it follows that effluent containing amalgams can pose a health hazard to the community at large. Also, certain metals such as silver are commercially valuable if recovered in quantity. For those reasons, it is desirable to devise systems, apparatus and processes for removing amalgams from dental office effluent and efficiently recycling those amalgams.

In addition to removing amalgams, other matter disposed into dental office suction effluent includes aluminum oxides used in air abrasion treatments and other solid waste material. These solid materials tend to wear out or damage vacuum pumps and other equipment downstream of the dental chair suction apparatus, and also constitute effluent water contaminants. Therefore, it is desirable for the apparatus to remove solid abrasive material and other particulate waste from the dental office suction effluent.

The World Health Organization also points out that amalgam separators, installed in the waste water lines of many dental offices, dramatically decrease the release of mercury into the public sewer system. However, critics say that the separators are still not mandatory in some states of the United States. "Purchasing, installing and operating dental amalgam separators: Practical issues". The Journal of the American Dental Association. 134 (8): 1054-65. doi: 10.14219/jada.archive.2003.0319. PMID 12956345. Recently, the EPA has enacted nation-wide regulations requiring amalgam separators in dental offices.

Previously known apparatuses for removing amalgam particles from dental office suction effluent are known to include a collecting tank for collecting a day's accumulation of suction effluent from one or more sources of such waste. The waste is sucked from the dental chair suction apparatus and into the collecting tank by a vacuum pump. When the vacuum pump is turned off, an outlet valve is opened and the accumulated waste is deposited into a separation device intended to separate metal particles from the effluent liquid. Flow into the separation device is induced by the head of fluid in the collecting tank. Particles passing through the separation device are separated from the waste by gravity and settle to the bottom of the separation device. The flow rate is dependent on the head inside the collecting tank; as the head diminishes, the flow rate also diminishes. The changes in flow rate are undesirable because the particle separation rate is affected, and the system becomes prone to plugging when the flow rate decreases. Another drawback to such systems are that, since the waste can be deposited only when the vacuum pump is off, waste is usually moved to the separation device at the end of the day. As a result, the collecting tank and separation device tend to be undesirably large and the whole process is time consuming.

Another known apparatus is a centrifuge type system that separates heavier metal particles from effluent liquid by collecting the particles at the peripheral wall of the centrifuge. This apparatus does not effectively separate lighter particles, and is expensive to purchase and operate due to the complexity of its mechanical parts.

Yet another known apparatus uses a dedicated mechanical pump to suction waste liquids through a separator device. Again, a dedicated pump can be expensive to purchase and to maintain, and can be undesirably space-consuming.

Such known systems can become quite complex, unwieldy and expensive, as for example that disclosed in U.S. Pat. No. 5,885,076 granted 23 Mar. 1999. It teaches the use of sedimentation, co-precipitation and filtration in an expensive complicated apparatus that is probably economical, if at all, only for relatively large installations such as a military base dental complex.

U.S. Pat. Nos. 6,692,636 and 6,592,754 are patents that disclose systems for removing amalgam from dental office suction effluent. After collecting the amalgam and other solid waste the dentist is left with the problem of what to do with the waste. Either the dentist has to deal with his own hazardous waste or he can send his collected material to a recycler. In either case, the "collection container" needs to be disposable and easily replaceable.

WO2018071615, US2018/0338822 and US2018/009831 disclose dental amalgam separation and recycling systems that have recently been developed for the efficient separation and collection of particles and amalgam waste from dental offices.

Most existing recycling programs generally require the provision of bulky shipping materials and the delivery of those materials to the dentist for every full container. If such materials are not provided and the materials are not properly recycled a large part of the benefit of collecting the amalgam waste can be lost. It is important that the waste is recycled under federal guidelines in order to make sure the full benefits of amalgam separation are achieved.

Additionally, containers for collection, such as dental amalgam recycling systems, can be compromised by incorrect installation or misalignment, which can cause o-rings to deform and/or seal irregularly, and result in leakage.

SUMMARY OF THE INVENTION

The present invention overcomes several shortcomings of the prior technology and provides further advantages that will be apparent after reviewing the following detailed description.

With increased use of recycling systems in dental offices, medical offices and other types of recycling programs, storage and shipping has become an important element of commerce in the sale and leasing of large systems and machinery, as the recyclable containers are themselves a consumable good that must be replaced on a continuing basis. For systems that generate hazardous waste, it is critical to have the ability to tightly seal these containers in an airtight and watertight manner for shipping and storage. The snap-on lids of the present invention are particularly well-suited for use with such systems, and the detachable collection containers used therein.

In one aspect, the invention provides a convenient, easy-to-use, and largely failure-proof snap-on cap for use with containers, such as collection containers used for collecting and recycling particles and amalgam waste that is collected using dental amalgam separation, collection and recycling systems. In another aspect, the collection container is used to collect separated amalgam and other solids from dental waste vacuum lines. In another aspect, the snap-on cap attaches to a collection container to provide secure containment of waste during handling, storage and transport.

In certain embodiments, the snap-on cap comprises at least three snap joints distributed evenly around the perimeter of the snap-on cap. In particular embodiments of the invention, the snap-on cap comprises three, four, five, six, seven or eight snap joints, preferably distributed evenly around its perimeter. Each snap joint comprises a cantilevered hook snap at its distal end.

In another aspect, the snap-on cap of the present invention can be securely attached or snapped onto or over the top surface of a container, by applying downward pressure to the snap-on cap, including said snap joints. When the snap-on cap is aligned over the top surface of the container, and downward pressure is applied to the snap-on cap, the cantilevered hook snap at the distal end of each snap joint engages with the top surface of the container, and said snap-on cap is securely mated with the container.

In one aspect, the snap-on cap is installed and secured by pressing down over the top of a container having a top with a perimeter surface, such that the snap joints will engage the container. In certain embodiments, each snap joint will make a sound, such as a clicking sound, when the snap-on cap has been pressed down, such that the cantilevered hook engages with the perimeter surface of the container. In another aspect, said snap-on cap is secured to the container when the snap joints are aligned over the container, and downward pressure is exerted on the snap-on cap onto the top of the container.

Once secured by exerting downward pressure on each of the snap joints, the snap-on cap cannot be easily removed without simultaneously pulling each of the snap joints out and away from the perimeter surface of the container. In certain embodiments, the snap joints are made of a rigid material that resists being pulled away from the surface of the container. In certain preferred embodiments, the snap-on cap and snap joints are made from one unitary piece, and may be comprised of plastic, molded plastic or metal.

In another aspect, the snap-on cap of the present invention comprises a depressed or recessed area, which may be fluted, or grooved, for better handling, on each side of the snap joints. The fluted recess area provides for easy one-handed grip of the snap-on cap while also providing additional rigidity and support along the snap-on cap perimeter surface when installed onto the top surface of the container. By gripping the snap-on cap at these recessed areas when placing the snap-on cap onto the container, the user is better able to exert downward pressure uniformly across the entire surface of the snap-on cap, so that all of the snap joints engage with the rim of the collection container. If less than all of the snap joints initially engage, the user may continue to exert light downward pressure on those snap joints that have not engaged.

In certain embodiments, the snap joints or the fluted or depressed recess area on each side of the snap joints may further be marked, for example, they may be labeled or marked on its surface with an indicator, such as the word or words "PRESS" or "PRESS DOWN," in order to assist the user in conducting the snap-on process in which the snap-on cap is firmly attached to the collection container by engaging all of the snap joints of the snap-on cap onto the rim of the collection container.

As will be readily recognized by the skilled artisan, the snap-on cap of the present invention may be adapted in its general conformation, such as its size and shape, so long as the conformation matches with the conformation of the container for which it has been designed. In preferred embodiments, the snap-on cap of the present invention may be used in conjunction with a collection container that has a top surface, wherein the top surface comprises one or more openings or holes, such as ports that project outward from the top surface. In such embodiments, the snap-on cap of the present invention may be modified in a manner that allows the snap-on cap to fit over and securely seal the one or more openings or holes in the top surface of the collection container.

In certain embodiments, the snap-on cap of the present invention is in a conformation that is compatible for use with a recycling or storage container, for example, useful in a dental amalgam separation and recycling system, such as those described in WO2018071615, US2018/0338822 and US2018/009831, the disclosure of which are hereby incorporated herein by reference.

The general conformation of the snap-on cap of the present invention may be round, oval or ovate, square, rectangular, or another shape, depending upon the shape of the top surface of the container for which it has been designed. Preferred conformations of the snap-on cap and the containers useful in the present invention include round, oval and ovate.

In certain embodiments, the snap-on cap is designed for a collection container, and the top surface of said collection container may comprise one or more open ports that extend upward or outward from its top surface. In such embodiments, the snap-on cap comprises one or more closed-ended snap-on cap ports that can each be aligned with the one or more open ports on the top surface of the collection container. The snap-on cap ports are recessed, complementary to the one or more ports that extend from the collection container, in order to accommodate the one or more open ports on the top surface of the container. The snap-on cap ports are complementary in shape and location such that each snap-on cap port can be aligned with a port on the top surface of the collection container such as an inlet port or an outlet port. For example, where the collection container comprises an open inlet port and an open outlet port, the snap on cap will have two closed ports, the bottom of one snap-on cap port constituting a female complement to the male inlet port projecting from the top surface of the collection container; and the bottom of the second snap-on cap port constituting a female complement to the male outlet port projecting from the top surface of the collection container. The result is that each snap-on cap port forms a sleeve around the port on the top surface of the collection container. In a preferred embodiment, the snap-on cap and the top surface of the collection container each comprise two ports, in the case of the collection container, the ports comprising an open inlet port and an open outlet port, and the snap-on cap comprises a first closed port complementary to the open inlet port, and the second snap-on cap port complementary to the open outlet port, such that the first and second snap-on cap ports can be aligned with the inlet and outlet ports of the collection container when the snap-on cap is properly positioned over the top of the collection container.

In certain embodiments, wherein the collection container may comprise at least an open inlet port and an open outlet port of distinct heights, sizes and/or shapes, the snap-on cap of the present invention will comprise a closed-ended snap-on cap port of a first height, size and/or shape and location, to align with the inlet port, and a closed-ended snap-on cap port of a second height, size and/or shape and location, to align with the outlet port.

Each of the snap-on cap ports may comprise a face seal, said face seal comprising an o-ring or a flat gasket that is installed, such that, when the snap-on cap is secured to the collection container, each face seal serves as a primary seal at its respective port. The face seals at each port are desirable, for example, in order to reduce or eliminate leakage at the port from the collection container, which might otherwise result in leakage between the collection container and the snap-on cap.

Where desired, each port of the collection container may further comprise a gland seal, said gland seal comprising an o-ring installed around each port of the collection container, such that, when the snap-on cap is attached to the collection container, the gland seal serves as an additional seal at its respective port. The gland seals are desirable, for example, in order to further reduce or eliminate leakage at the port from the collection container, which might otherwise result in leakage between the container and the snap-on cap.

In certain embodiments, each snap-on cap port comprises a reservoir, wherein said reservoir provides additional space at the top of each snap-on cap port, in order to increase volume capacity and allow for thermal expansion of liquid due to an increase in temperature during storage or transport of the collection container with the snap-on cap attached. The reservoir further helps reduce or eliminate leakage at the port from the collection container, which might otherwise occur due to thermal expansion occurring during storage or transport.

In certain embodiments, the snap-on cap is especially useful in conjunction with a collection container that comprises a lip, rim or ridge projecting out from the perimeter at or near the top surface of the container. When the snap-on cap is pressed down over the top of the collection container, the snap joints of the snap-on cap will engage the lip, rim or ridge of the collection container, thus creating a tight and secure seal between the snap-on cap and the collection container.

Thus in certain embodiments, the present invention comprises a snap-on cap suitable for mating securely with a collection container, said container having an outer mating surface comprising a ridge or lip projecting outward from the collection container. The ridge or lip forming the outer mating surface follows the perimeter of the collection container at or near the top surface of the collection container. The snap-on cap comprises snap joints that engage with the ridge or lip when the snap-on cap is pressed onto the top of the collection container, and the cantilevered hooks of the snap joints pass over the ridge or lip and click into locked or mated position.

In certain embodiments, the collection container comprises an inlet port and an outlet port projecting from its top surface, and the snap-on cap comprises a shape that is complementary to the collection container's top surface, such that the snap-on cap comprises recesses that accommodate the inlet port and outlet port projections. In certain embodiments, said inlet port and outlet port may be of a first height and a second height, respectively, wherein the first height is different from the second height. In such embodiments, the snap-on cap surface comprises complementary, or reciprocal ports that are shaped to accommodate the different heights of the inlet port and outlet port of the collection container.

As described above, the present invention provides a simple to use, effective and efficient means for forming a tight secure seal with a container, such as a collection container useful for the collection, storage and transport of dental amalgam waste. Once the snap-on cap and collection container are securely mated, the snap-on cap and collection container resist coming apart, which substantially reduces or eliminates the potential for leakage of the contents from said collection container. The snap-on cap of the present invention is designed so that it will engage the top surface of the collection container with relatively slight downward pressure on the snap-on cap, and each snap joint of the snap-on cap will engage with the mating surface of the collection container to provide a consistent seal around the entire perimeter of the collection container.

Because of the ease with which the snap-on cap is secured to the collection container, the likelihood that leakage will occur is minimized, for example, leakage that might otherwise occur due to incorrect installation, or due to incomplete engagement of a cap with a collection container.

An additional advantage of the snap-on cap of the present invention is that it requires minimal manipulation by the user, such that it may be secured to the collection container by a single user with relative ease, to the extent that it may be secured using one hand to exert downward pressure on the snap-on cap over the collection container. This is particularly desirable in cases where a single user is replacing one collection container with another, and may be required to remove and cap the container in a narrow, tightly spaced or dark area, without a clear line of sight to observe the collection container, or without access to a flat surface for placement of the collection container, or without sufficient space for maneuvering the collection container without the potential for tipping or tilting the collection container, which can result in spillage.

BRIEF DESCRIPTION OF THE DRAWINGS

(FIG. 3B) viewing from the bottom. The snap-on cap ports (3) are visible in both views. Only three snap joints (6) are fully visible in FIG. 3A. All six individual snap joint (6) are visible in FIG. 3B;

In FIG. 4A, the snap-on cap (cross-hatched) is viewed from the side and two O-rings (5) are visible in cross section at the connection points between the inlet and outlet ports of the collection container and the snap-on cap ports. FIG. 4B illustrates in greater scale the placement of the O-rings to form the face seal (5a) and the gland seal (5b), which provide primary and secondary seals, respectively between the port of the container (4) and the snap-on cap port (3), when the snap-on cap is fitted over the top surface of the container.

FIG. 8 further illustrates the inclusion of o-rings in each snap-on cap port, which serve as face seals.

DETAILED DESCRIPTION OF THE INVENTION

In certain embodiments, the present invention comprises a container and a snap-on cap which are designed to mate together, and are suitable for collecting dental amalgam. The container comprises a top surface, said top surface comprising an outer perimeter; and inlet and outlet ports projecting outward from said top surface. The top surface may further comprise a rim around the outer perimeter of said top surface. The snap-on cap comprises an outer perimeter and further comprises a first snap-on cap port that is complementary in shape and location to the inlet port of the container; and a second snap-on cap port that is complementary in shape and location to the outlet port of the container.

The snap-on cap comprises at least three snap joints having a distal end, the snap joints being equally spaced along its outer perimeter. Each snap joint comprises a cantilevered hook snap at its distal end, so that the cantilevered hook snap of each snap joint can engage with the rim around the outer perimeter of the top surface of said container.

When the snap-on cap is placed over the container, and the first and second snap-on caps ports are aligned with said inlet port and outlet port, respectively, of the container, and downward pressure is applied to the snap-on cap while the container remains stationary, the cantilevered hook snap of each snap joint will engage the outer perimeter of the top surface of said container and said snap-on cap will mate securely onto the container.

In certain embodiments, the container and snap-on cap are provided together in a kit. In other embodiments, the snap-on cap may be provided individually as a substitute or replacement cap. Such substitute snap-on cap can be used with a collection container for which no snap-on cap was originally provided, or as a replacement in case the original snap-on cap is lost or damaged.

Figure 1:
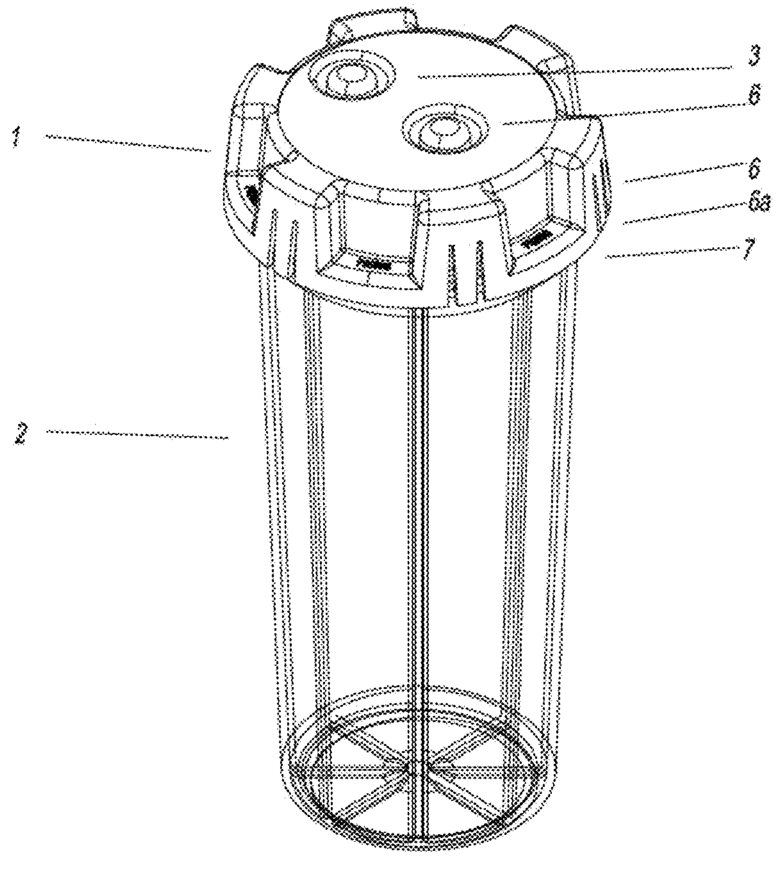
FIG. 1 illustrates a snap-on cap according to an embodiment of the invention comprising six snap joints, in use, with the snap-on cap (1) secured in position onto the top of a collection container (2). Also visible are the snap-on cap ports (3); the snap joint (6); the snap hinge at the distal end of the snap joint (6a); and the recessed area (7) between snap joints.
Figure 2:
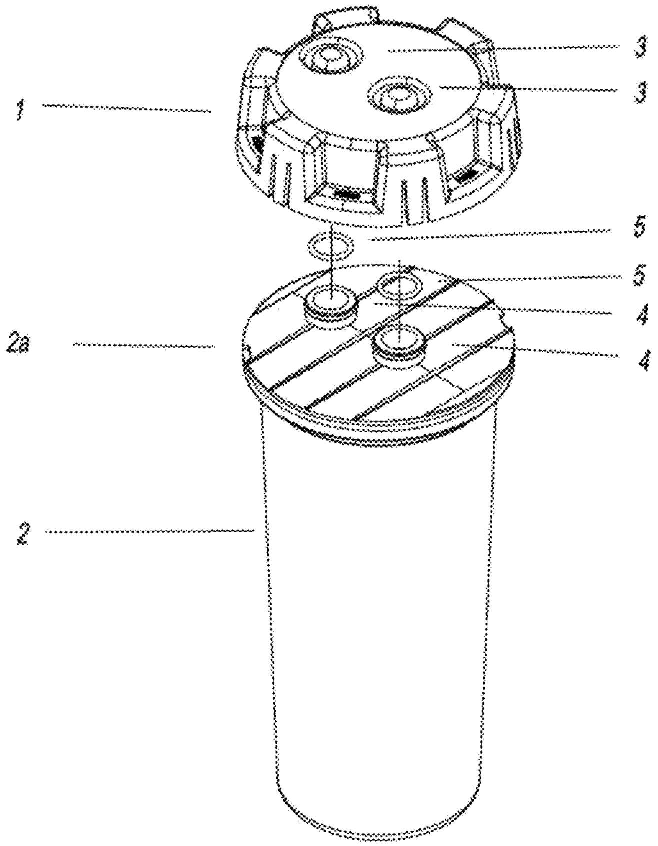
FIG. 2 is a schematic side view of a snap-on cap according to an embodiment of the invention comprising six snap joints, in which the snap-on cap (1) is shown in position above, and ready for placement over, the top surface (2a) of a collection container (2). O-rings (5) are shown that are placed between the inlet and outlet ports (4) on the collection container and the snap-on cap ports (3).
Figure 3A:
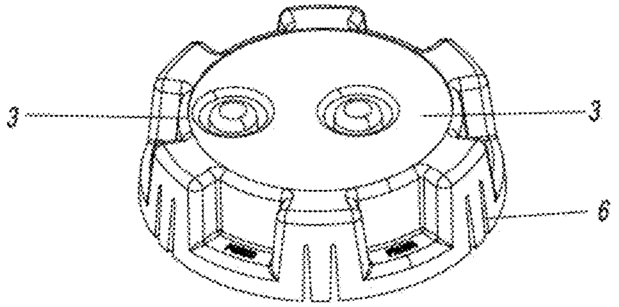
FIGS. 3A and 3B provide schematic perspective depictions of a snap-on cap according to an embodiment of the invention comprising six snap joints, (FIG. 3A) viewing from the top.
Figure 3B:
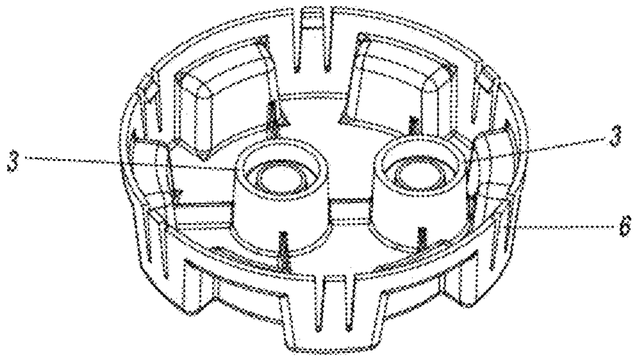
Figure 4A:
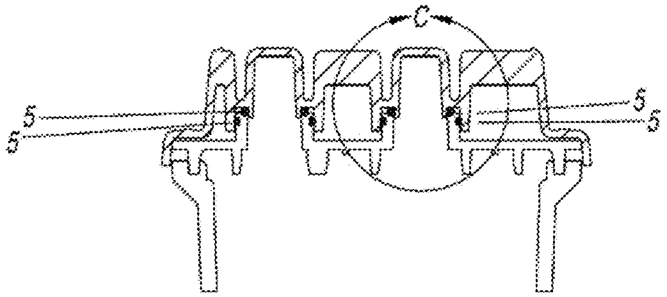
FIGS. 4A and 4B provide schematic depictions of a snap-on cap according to an embodiment of the invention, when the snap-on cap (cross-hatched) is fitted over and connected to the top surface of the collection container.
Figure 4B:
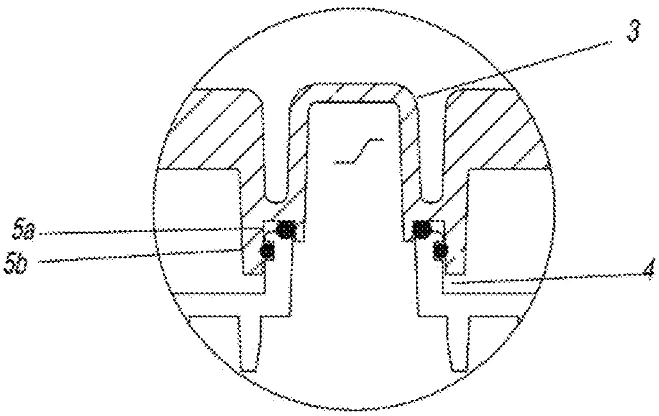
Figure 5A:
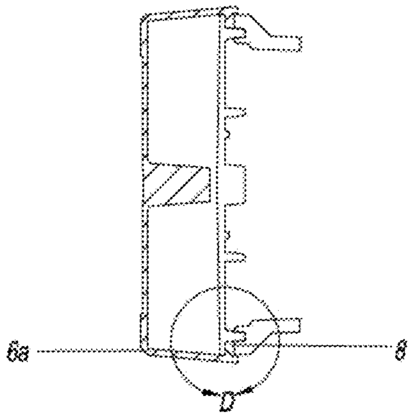
FIGS. 5A and 5B provide schematic depictions of a snap-on cap according to an embodiment of the invention, viewed from the side, so that the cantilever hook at the distal end of the snap joints can be seen. FIG. (5A) illustrates a detailed view of the snap-on cap from the side. FIG. (5B) illustrates a scaled-up view of the snap-on cap from the side. Again, the cantilever hook (6a) at the end of a snap joint (6) is viewed after the snap-on cap (cross-hatched) has been pressed down so that the cantilever hook (6a) engages the ridge (8) along the perimeter of the top surface (2a) of the collection container.
Figure 5B:
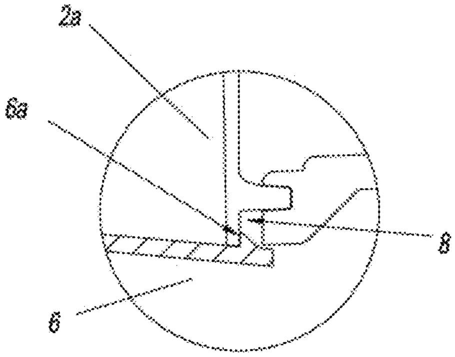
Figure 6:
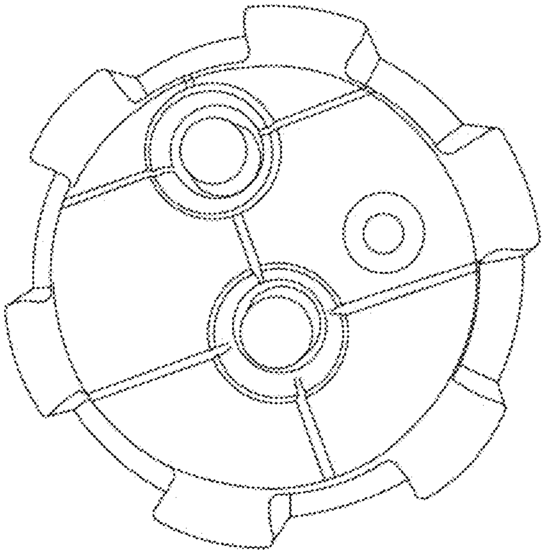
FIG. 6 illustrates the top of a snap-on cap according to an embodiment of the invention, showing the snap-on cap viewed from above. The snap-on cap ports are both visible, as are the recessed areas between snap joints.
Figure 7:
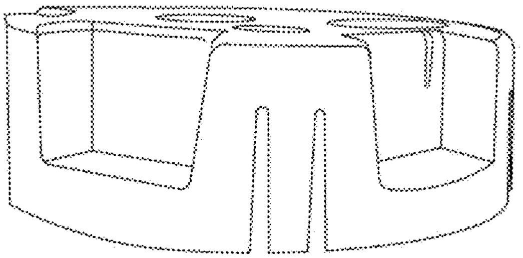
FIG. 7 illustrates a snap-on cap according to an embodiment of the invention, showing the snap-on cap viewed from the side. The snap joint and fluted recessed areas are visible.
Figure 8:
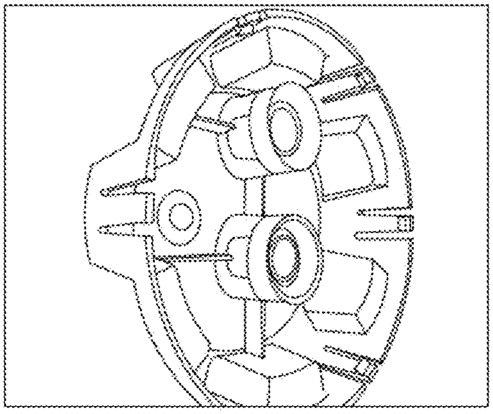
FIG. 8 illustrates the underside of a snap-on cap according to an embodiment of the invention, showing the snap-on cap viewed from underneath at an angle.
Figure 9:
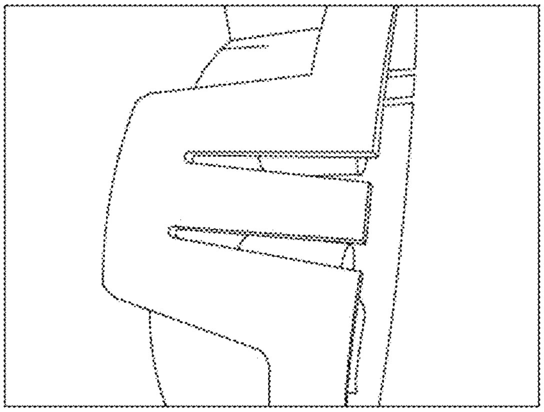
FIG. 9 illustrates a snap-on cap according to an embodiment of the invention, viewed from the side, showing a snap joint and the fluted recess areas on either side of the snap joint.

The following further description is provided with respect to each of the drawings:

FIG. 1 illustrates a snap-on cap according to an embodiment of the invention, with the snap-on cap secured in position onto the top of a collection container, for particular use in a dental office. As used in the present specification, the term "cap" is used to describe a separate piece that can be attached to a container, typically over the top—and can also be referred to as a "lid," "top" or "cover."

According to one aspect of the instant invention, a snap-on cap is provided for conveniently forming an air-tight and liquid-tight seal on a collection container, which facilitates a customer's regulatory compliance and environmental safeguards. The snap-on cap comprises three or more snap joints which are evenly spaced around the perimeter of the snap-on cap. In certain preferred embodiments, the snap-on cap comprises three to eight snap joints evenly spaced around the perimeter of the snap-on cap. In especially preferred embodiments, the snap-on cap comprises four, five, six, seven or eight snap joints evenly spaced around the perimeter of the snap-on cap.

Preferably, each snap joint comprises a cantilever hook at its distal end so that applying downward pressure upon the snap-on cap, properly aligned above a container, will cause the snap joint to engage with the top surface of the container. In certain preferred embodiments, the top surface of the container comprises a rim or ridge along the perimeter of the container, close to the top surface, which allows the cantilever hooks at the end of each snap joint to engage firmly with the top surface of the snap-on cap. Optionally, the cantilever hook is designed to make a clicking sound when it engages with the rim, so that the user can audibly detect when each snap joint of the snap-on cap has engaged with the top surface of the container. Once the cantilever hook of the snap joint has engaged with the rim of the container, the snap joint cannot disengage from the container without being manually caused to do so by pulling the several cantilever hooks away from the perimeter of the top surface of the container. The snap-on cap cannot be removed from the container unless all of the snap joints are simultaneously disengaged from the container. The more snap joints, the more difficult removal of the snap-on cap becomes, and the less likely that the snap-on cap and container will become disengaged unintentionally.

Separating each of the snap joints from adjoining snap joints are uniform spaces. The spaces on each side of the snap joints may each include a fluted recess area, which provides a convenient surface for applying downward pressure on the snap-on cap onto the top surface of the container, in order to cause the snap joints to engage with the top surface of the container. Optionally the cantilever hook makes a clicking sound once it engages with the rim, so that the user can audibly detect when each snap joint of the snap-on cap has engaged with the container.

In one aspect, the invention provides a convenient, easy-to-use, and largely failure-proof snap-on cap for use with containers, such as collection containers used for collecting and recycling particles and amalgam waste that is collected using dental amalgam separation, collection and recycling systems. In another aspect, the collection container is used to collect separated amalgam and other solids from dental waste vacuum lines. In another aspect, the snap-on cap attaches to a collection container to provide secure containment of waste during handling, storage and transport.

In one aspect, the snap-on cap of the present invention can be securely attached or snapped onto or over the top surface of a container, by applying light pressure to two or more snap joints. Each snap joint comprises a cantilevered hook snap at its distal end to engage and secure said snap-on cap onto the container when aligned and pressed down onto the top of the container.

In certain embodiments, the snap-on cap comprises at least three snap joints distributed evenly around the perimeter of the snap-on cap. In particular embodiments of the invention, the snap-on cap comprises three, four, five, six, seven or eight snap joints distributed evenly around its perimeter. In certain embodiments, each snap joint comprises a portion of the snap-on cap extending downward and having a cantilevered hook at its distal end. Gaps surround both sides of each snap joint, so that the distal end of each snap joint is able to flex independently from the rest of the snap-on cap, so that when the distal end of the snap joint is subjected to pressure along its cantilevered hook, the distal end will flex to accommodate such pressure. In this manner, when the snap-on cap is subjected to downward pressure over the top of a container having a top surface having a rim, lip or ridge around its perimeter, each of the snap joints may flex at the distal end in order to accommodate such downward pressure, and engage with the rim, lip or ridge of the container.

In one aspect, the snap-on cap is installed and secured by pressing down on each of the snap joints over the top surface of a container having a rim, lip or ridge around the perimeter at or near the top surface. In certain embodiments, each snap joint will make a sound, such as a clicking sound, when the snap-on cap has been pressed down such that the cantilevered hook engages with the rim, lip or ridge around perimeter of the top surface of the container. In another aspect, said snap-on cap is secured to the container when the snap joints are aligned over the container, and downward pressure is exerted on the snap-on cap onto the top of the container.

Once secured by exerting downward pressure on each of the snap joints, the snap-on cap cannot be easily removed without simultaneously pulling the snap joints out and away from the perimeter surface of the container. In certain embodiments, the snap joints are made of a rigid material that resists being pulled away from the surface of the container. In other embodiments, the snap joints are made of a material that will break when a great deal of force is applied to pull the snap joints away from the container without simultaneously pulling the snap joints out away from the perimeter surface of the container. The snap joints comprise a distal end, and each snap joint comprises a cantilevered hook at its distal end. In certain embodiments, the distal end of each snap joint is surrounded by gaps, such that the distal end of the snap joint is able to flex when subjected to pressure. In particular, when the snap-on cap is subjected to downward pressure over a container having a rim, lip or ridge around the perimeter of its top surface, the distal ends of each snap joint are subjected to a force causing the distal end to flex outward and accommodate the rim, lip or ridge around the perimeter of the container, and the cantilevered hook will engage with such rim, lip or ridge. In certain preferred embodiments, the snap-on cap and snap joints are made from one unitary piece, and may be comprised of plastic, molded plastic or metal.

In another aspect, the snap-on cap of the present invention comprises a fluted recess area on each side of the snap joints, said fluted recess area providing for easy hand grip of the snap-on cap while also providing additional rigidity and support along the collection container top perimeter surface when installed.

In certain embodiments, the snap joints or the fluted, or depressed, recess area on each side of the snap joints may further be marked, for example may be labeled or marked on its surface with an indicator, such as the word or words "PRESS," "PRESS HERE" or "PRESS DOWN," in order to simplify the snap-on process in which the snap-on cap is firmly attached to the collection container. Thus, including an indicator, such as "PRESS," "PRESS HERE" or "PRESS DOWN" further facilitates use of the snap-on cap by the user.

As will be readily recognized by the skilled artisan, the snap-on cap of the present invention may be adapted in its general conformation, such as its size and shape, in order to conform with the particular container or containers for which it has been designed. In other embodiments, the snap-on cap of the present invention may be used in conjunction with a container that has a top surface, wherein the top surface comprises one or more openings or holes.

In certain embodiments, the snap-on cap of the present invention is in a conformation that is compatible for use with a collection container, for example, useful in a dental amalgam separation and recycling system, as described in WO 2018071615, US2018/0338822 and US2018/009831, the disclosure of which are hereby incorporated herein by reference.

The general conformation of the snap-on cap of the present invention may be round, oval or ovate, square, rectangular, or another shape, depending upon the shape of the top surface of the container for which it has been designed. Preferred conformation of the snap-on cap of the present invention is round, and the top surface of the collection container will also be round.

In certain embodiments, where the top surface of the container comprises one or more ports, that extend upward or outward from the top surface, the snap-on cap comprises one or more snap-on cap ports that are complementary to the one or more ports extending from the top surface of the container so that each snap-on cap port can be aligned with the one or more ports on the top surface of the container. In certain embodiments wherein the container comprises an inlet port and outlet port of distinct heights, the snap-on cap of the present invention comprises a snap-on cap port of a first height to align with the inlet port, and a snap-on cap port of a second height, to align with the outlet port.

Each of the snap-on cap ports may comprise a face seal, said face seal comprising an o-ring or a flat gasket that is installed, such that, when the snap-on cap is secured to the collection container, each face seal serves as a primary seal at its respective port. The face seals at each port are desirable, for example, in order to reduce or eliminate leakage at the port from the container, which might otherwise result in the presence of leakage between the container and the snap-on cap.

Where desired, each port of the collection container may also comprise a gland seal, said gland seal comprising an o-ring installed as part of the collection container, such that, when the snap-on cap is attached to the collection container, the gland seal serves as a secondary seal at its respective port. The secondary seals are desirable, for example, in order to further reduce or eliminate leakage at the port from the container, which might otherwise result in the presence of leakage between the container and the snap-on cap. In certain embodiments, where the snap-on cap does not comprise a face seal, the gland seal may serve as a primary seal at its respective port.

In certain embodiments, each snap-on cap port comprises a reservoir, wherein said reservoir provides additional space at the top of each snap-on cap port, in order to increase volume capacity and allow for thermal expansion of liquid due to an increase in temperature during storage or transport of the collection container with the snap-on cap attached. The reservoir may further help reduce or eliminate leakage at the port from the container, which might otherwise occur due to such thermal expansion occurring during storage or transport.

In certain embodiments, the snap-on cap is especially useful in conjunction with a container that comprises a lip, rim or ridge projecting out from its perimeter surface near the top of the container. When the snap-on cap is pressed down over the top of the container, the snap joints of the snap-on cap will engage the lip, rim or ridge of the container, thus creating a tight and secure seal.

In certain embodiments, the invention comprises a container, useful as a dental amalgam collection container, which includes a snap-on cap. The dental amalgam collection containers of the present invention may further comprise a two-tiered snap-on cap that enables people with hands of different sizes to grip the cap and to align and engage the cap with the collection container.

Thus in certain embodiments the present invention comprises a snap-on cap suitable for mating securely with a container, said container having an outer mating surface comprising a ridge or lip projecting outward from the container. The snap-on cap comprises snap joints that engage with the ridge when the snap-on cap is pressed onto the top of the container, and the snap joints pass over the ridge. In other embodiments, the present invention comprises a kit, the kit comprising a container, a snap-on cap for the container, and packaging for sale, purchase or shipment.

In certain embodiments, the container comprises an inlet port and an outlet port projecting from its top surface. Said inlet port and outlet port may be of a first height, size and/or shape and a second height, size and/or shape, respectively, wherein the first height, size and/or shape is different from the second height, size and/or shape; and the snap-on cap surface may comprise reciprocal ports to accommodate the distinct height, size and/or shapes of the inlet port and outlet port of the container, respectively.

As described above, the present invention provides a snap-on cap that is simple to use, effective and efficient means for forming a tight secure seal with a container, which resists coming apart unintentionally, and which substantially reduces or eliminates the potential for leakage of the contents from said container. The snap-on cap of the present invention is designed so that it will engage the top of the container with very slight downward pressure on the snap-on cap, and each snap joint of the snap-on cap will engage the container to provide a consistent seal around the entire perimeter of the container.

According to one aspect of the invention, the snap-on cap of the present invention can be used in conjunction with dental amalgam collection, storage, transport and recycling systems. In another aspect, the snap-on cap of the present invention is useful with a collection container for collecting dental amalgam waste, that is closed on all sides and comprises inlet and outlet ports projecting from its top surface, and is preferably detachable from the dental amalgam collection system, in order to allow for replacement.

In certain aspects, the invention can have features built in to make recycling easier and to reduce the amount of packaging and waste in the handling, storage and recycling of dental amalgam waste containers.

In another embodiment of the invention designed to minimize the space required to replace the collection container of a dental amalgam collection and recycling system.

All publications, web-sites, patents and patent applications cited in the specification are hereby incorporated herein by reference in their entirety for the disclosure for which they are cited.

Having read the above specification, other alternatives and variants of the above described methods and apparatus suitable for practicing the methods will occur to those skilled in the technology. Such alternatives, modifications and variants fall within the scope of the present invention.

The invention as described above also includes the following non-limiting claims, which describe particular embodiments of the invention.

The invention claimed is:

1. A dental amalgam container system comprising:

a container including:

a top surface comprising a container outer perimeter and a rim around the container outer perimeter;

an inlet port projecting outwardly from the top surface; and an outlet port projecting outwardly from the top surface, the inlet port and the outlet port arranged [asymmetrically] on the top surface such that one of the inlet port and outlet port is closer to the container outer perimeter; and a cap including:

a cap outer perimeter configured to engage with the rim around the container outer perimeter; and at least three snap joints equally spaced along the cap outer perimeter, each snap joint comprising a distal end and a cantilevered hook snap at each distal end, wherein each snap joint is configured to engage with the rim around the container outer perimeter, wherein each cantilevered hook snap of each snap joint is configured to engage the container outer perimeter and the cap is configured to mate securely onto the container when downward pressure is applied to the cap on the container.

2. The dental amalgam container system of claim 1, wherein the cap further includes:

a first cap port that is complementary in shape and location to the inlet port of the container such that when the cap is placed over the container, the first cap port is aligned with the inlet port of the container; and a second cap port that is complementary in shape and location to the outlet port of the container such that when the cap is placed over the container, the second cap port is aligned with the outlet port of the container.

3. The dental amalgam container system of claim 2, wherein the first cap port further includes a first reservoir at a top of the first cap port.

4. The dental amalgam container system of claim 3, wherein the second cap port further includes a second reservoir at a top of the second cap port.

5. The dental amalgam container system of claim 1, wherein the cap further includes a plurality of recessed areas between each snap joint.

6. The dental amalgam container system of claim 1, further comprising a first O-ring encircling the inlet port and a second O-ring encircling the outlet port.

7. The dental amalgam container system of claim 1, wherein the inlet port is of a first height and the outlet port is of a second height, the first height different than the second height.

8. A dental amalgam container system comprising:

a container configured to collect dental amalgam, the container comprising:

a top surface comprising a container outer perimeter and a rim around the container outer perimeter, a container top portion including a flange structure located below the top surface and extending radially outwardly relative to the container outer perimeter;

an inlet port projecting outwardly from the top surface, an outlet port projecting outwardly from the top surface, the inlet port and the outlet port are arranged [asymmetrically] on the top surface such that the inlet port is closer than the outlet port to the container outer perimeter; and a cap comprising:

a cap outer perimeter configured to engage with the rim around the container outer perimeter, a first cap port that is complementary in shape and location to the inlet port of the container such that when the cap is placed over the container, the first cap port is aligned with the inlet port of the container; and a second cap port that is complementary in shape and location to the outlet port of the container such that when the cap is placed over the container, the second cap port is aligned with the outlet port of the container.

9. The dental amalgam container system of claim 8, further comprising a first O-ring encircling the inlet port and a second O-ring encircling the outlet port.

10. The dental amalgam container system of claim 8, wherein the inlet port is of a first height and the outlet port is of a second height, the first height different than the second height.

11. The dental amalgam container system of claim 8, wherein the cap further includes at least three snap joints equally spaced along the cap outer perimeter, each snap joint comprising a distal end and a cantilevered hook snap at each distal end, wherein each snap joint is configured to engage with the rim around the container outer perimeter, wherein each cantilevered hook snap of each snap joint is configured to engage the container outer perimeter and the cap is configured to mate securely onto the container when downward pressure is applied to the cap on the container.

12. The dental amalgam container system of claim 11, wherein the cap further includes a plurality of recessed areas between each snap joint.

13. The dental amalgam container system of claim 8, wherein the first cap port further comprises a first reservoir at a top of the first cap port.

14. The dental amalgam container system of claim 13, wherein the second cap port further comprises a second reservoir at a top of the second cap port.

* * * * *